(12) United States Patent
Zhang et al.

(10) Patent No.: US 12,482,173 B2
(45) Date of Patent: Nov. 25, 2025

(54) ENHANCED FULL-BODY RECONSTRUCTION USING A SINGLE CAMERA

(71) Applicant: Intel Corporation, Santa Clara, CA (US)

(72) Inventors: Guoqing Zhang, Tampere (FI); Bennett Ng, San Francisco, CA (US)

(73) Assignee: Intel Corporation, Santa Clara, CA (US)

(*) Notice: Subject to any disclaimer, the term of this patent is extended or adjusted under 35 U.S.C. 154(b) by 826 days.

(21) Appl. No.: 17/645,681

(22) Filed: Dec. 22, 2021

(65) Prior Publication Data

US 2022/0114786 A1    Apr. 14, 2022

(51) Int. Cl.
*G06T 17/00* (2006.01)
*G06N 3/088* (2023.01)

(52) U.S. Cl.
CPC ............ *G06T 17/00* (2013.01); *G06N 3/088* (2013.01); *G06T 2207/10028* (2013.01); *G06T 2207/20081* (2013.01); *G06T 2207/20084* (2013.01); *G06T 2207/30196* (2013.01)

(58) Field of Classification Search
CPC .. G06T 17/00; G06T 7/55; G06T 7/75; G06T 2207/30196; G06T 2207/10028; G06T 2200/08; G06T 2207/20084; G06T 2207/20081; G06T 2207/10016; G06T 13/40; G06T 7/251; G06T 13/00; G06T 2219/2016; G06N 3/088; G06N 20/00; A61B 5/4528; A61B 5/4509; A61B 5/4585; A61B 5/6878; G06F 3/011
See application file for complete search history.

(56) References Cited

U.S. PATENT DOCUMENTS

| | | | |
|---|---|---|---|
| 11,188,742 B2* | 11/2021 | Murakami | G06T 7/251 |
| 11,461,630 B1* | 10/2022 | Black | G06Q 30/0621 |
| 2018/0338742 A1* | 11/2018 | Singh | A61B 6/587 |
| 2024/0013415 A1* | 1/2024 | Tam | G06T 7/55 |

* cited by examiner

*Primary Examiner* — Xilin Guo
(74) *Attorney, Agent, or Firm* — Hanley, Flight & Zimmerman, LLC

(57) ABSTRACT

This disclosure describes systems, methods, and devices related to generating a three-dimensional full-body reconstruction using image data from a single camera. A method may include receiving first point cloud data from the camera, the point cloud data representing a person; identifying a first human body template, the first human body template representing body joints; generating, based on a comparison of the first human body template to the first point cloud data, parameters associated with the body joints; and generating, based on the parameters, a second human body template representing the person.

18 Claims, 8 Drawing Sheets

ENHANCED FULL-BODY RECONSTRUCTION USING A SINGLE CAMERA

TECHNICAL FIELD

This disclosure generally relates to systems and methods for generating images and, more particularly, to reconstructing three-dimensional body images using two-dimensional image data.

BACKGROUND

Generating three-dimensional data from two-dimensional data may be challenging and inaccurate, and may require a moving camera or multiple cameras to provide multiple two-dimensional images with which to construct a three-dimensional representation of the image data. There is currently no technique for generating a three-dimensional full-body reconstruction based on two-dimensional image data from a single, stationary camera.

DETAILED DESCRIPTION

Figure 1:
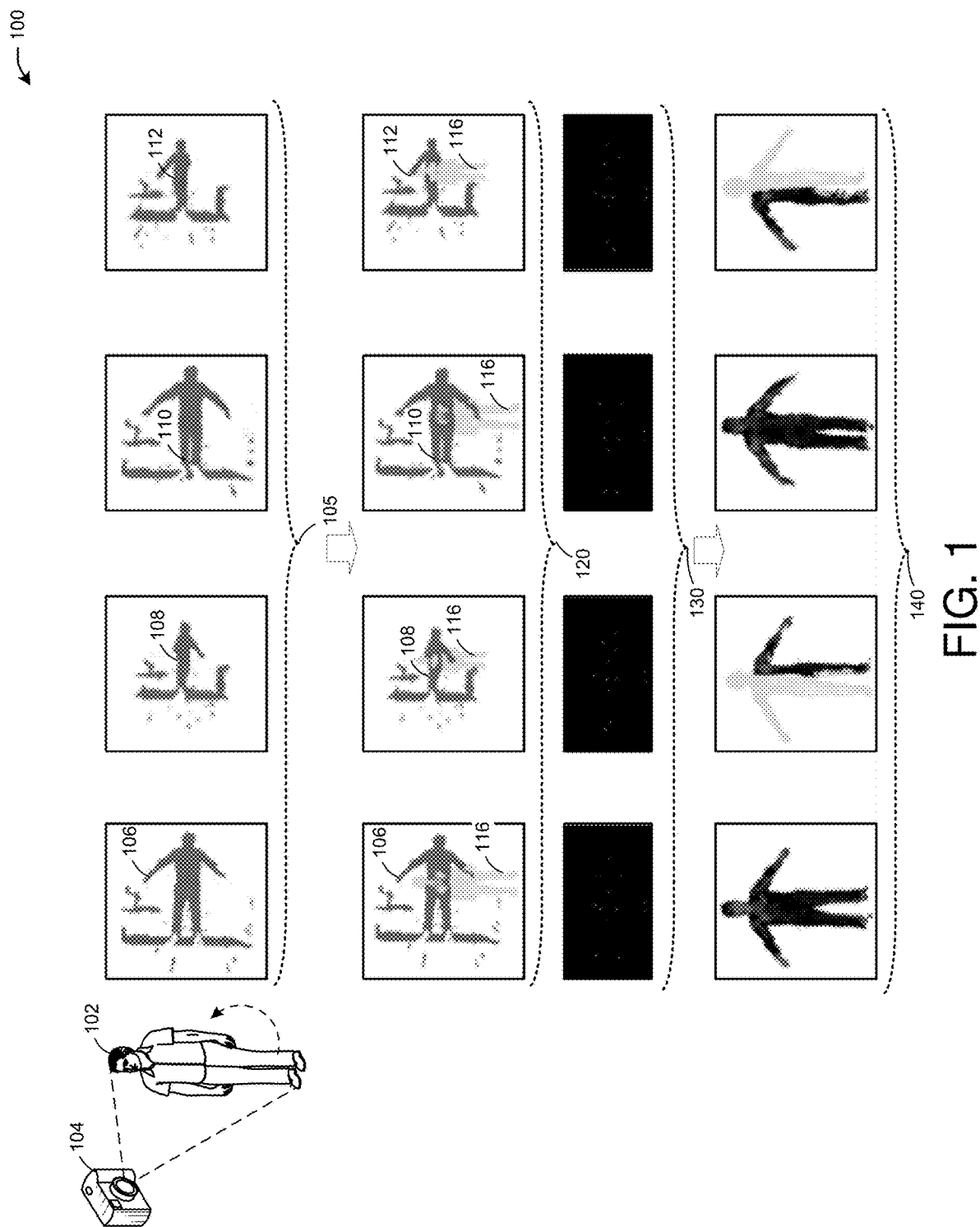
FIG. 1 is an example system for generating a full-body reconstruction using a single camera, according to some example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Accurate three-dimensional body shape and pose models may be useful for various purposes. There are a number of different methods by which such three-dimensional models may be generated. One such method may involve using a monocular camera to capture scans of a user. However, a sequence of partial RGB-D data captured by the camera while a user rotates in a scene is a challenging dataset with which to produce a full-body three-dimensional reconstruction for the user, and may lead to inaccurate reconstruction. Despite being instructed to hold a specific posture during scans performed by the camera, it is unlikely that the user will be able to hold the exact posture without at least some posture and position changes. Even slight posture and position changes make traditional rigid-body methods for producing three-dimensional reconstructions insufficient.

Additionally, many non-rigid methods suffer from both noisy datasets and lack of anatomical correspondence in the data. Examples of these conventional rigid and/or non-rigid methods may include an operator moving a camera around the user maintaining a rigid pose, a turntable rotating the user maintaining a rigid pose in front of a monocular camera, using multiple cameras, and/or visually or verbally instructing the user to move to a pre-defined posture frame. The first three of these conventional solutions do not solve the problems associated with using a monocular camera, but rather are workarounds involving either 360 degree data or the use of multiple cameras. Further, the visual/verbal solution provides a poor user experience.

In contrast with these conventional approaches, the methods described herein allow for highly accurate three-dimensional reconstructions to be generated while only requiring a single monocular camera. This may, as an example, provide a solution for accurate full-body three-dimensional scanning in a home environment using limited equipment (e.g., a single monocular RGB-D camera).

To accomplish this, in one or more embodiments, a regression method may be employed that uses a parametric human body model to register partial data. The model may be a parametric mesh template (such as a skinned multi-person linear (SMPL) model, for example). The shape and size of the model may be determined based on values associated with one or more parameters. In this manner, the appearance of the model may be adjusted by adjusting the values of the parameters. For example, pose parameters may represent the position of data points indicative of joints of the model. As a second example, shape coefficients may represent the location of mesh vertices. At a high level, the method involves capturing a data set (for example, a point cloud and image data representing different poses of the user) using the monocular camera. As an example of this data capture process, the user may be instructed to hold a pose during the scan, and rotate their body to perform multiple partial scans at different rotation points. This data may then undergo several processing stages with respect to the model, so that the model may then be adjusted to best match the size and shape of the user represented by the point cloud. The output of this method may be an accurate three-dimensional representation of the user (in the form of the adjusted model), with the size and shape of the adjusted model being representative of the user's actual size and shape. Examples of adjustments made to the model with respect to the data set may be illustrated in at least FIGS. 5-6.

In one or more embodiments, the processing stages may include multiple stages of optimization (e.g., a sparse optimization stage using a sparse point cloud and a dense optimization stage using a dense point cloud). These two optimization stages may involve minimizing cost functions over the parameter space including N global rotation, N global translation, N set of pose parameters and one common set of shape coefficients, where N is the number of partial scans performed by the monocular camera. The method may also involve an intermediary stage in between the sparse optimization stage and the dense optimization stage, with the intermediary stage eliminating some or all of the noise remaining in the data set after the sparse optimization stage.

The use of two optimization stages may be beneficial because a point cloud may be unordered, noisy, and without anatomical correspondence. The noise may be due to measuring errors and ambient objects, like furniture in the images. The sparse optimization stage may provide the anatomical correspondence needed, and allow for the removal of noise. The dense optimization stage may then improve accuracy in terms of shape.

Before the optimization of the data set is performed, in one or more embodiments, initial values may be determined for the model parameters (e.g., rotation and translation parameters). Due to the non-convexity of the optimization problem, initial values for the parameters are important for convergence speed and the optimality of the result. The initial values may be determined as follows. First, an RGB (red, green, blue) image may be provided to a two-dimensional joint location estimator to generate ground truth pixels. Additionally, estimated pixels are calculated by applying a rigid body transform to the vertices of the template mesh, selecting vertices which have anatomical correspondence to the body joint key points, and projecting the selected vertices into two-dimensional using camera projection model. The ground truth pixels and the estimated pixels may be provided to an optimizer, which may generate estimated rotation and translation parameters to minimize the difference between the ground truth pixel values and the estimated pixel values (e.g., so that the model may then be adjusted to best match the size and shape of the user represented by the point cloud).

In one or more embodiments, following the initial parameter determinations, the first stage of the optimizer may include a sparse optimization stage. This sparse optimization stage may involve using two-dimensional RGB data produced by the monocular camera to identify data points in the data set that represent joints of the user. The sparse optimization stage may then establish correspondence between these points and depth data (e.g., LIDAR data captured by the camera). The purpose of this stage may include attempting to ascertain what model parameters to use so that the joint key points of the model match the joint key points of the data set produced by the monocular camera. The depth data from the camera in combination with the RGB data from the camera may provide a more accurate body shape (e.g., in comparison to existing techniques) using a few images taken at different angles with respect to the person (e.g., the person may rotate while the camera remains stationary).

Particularly, in some embodiments, the sparse optimization stage may involve re-using the estimated two-dimensional joint pixel locations to obtain the reference three-dimensional joint locations by aligning depth and RGB images. The optimizer searches the whole parameter space to minimize the residual between the reference three-dimensional joints location and selected vertices from template mesh.

In one or more embodiments, following the sparse optimization stage, an intermediary stage of the optimizer may involve noise cancellation and vertices selection for the dense optimization stage described below. The noise cancellation may be beneficial because a data set captured by the monocular camera may include data points that are not representative of the user being captured. For example, if the data set is being captured in a room including furniture, some of the data points in the data set may represent portions of the furniture. It is desirable to remove any of such extraneous points that are not associated with the user so that the model that is being adjusted is only based on data points relating to the user. In some embodiments, the noise removal and vertices selection by a k-nearest neighbors (KNN) algorithm.

In one or more embodiments, following the intermediary stage of the optimizer, the dense optimization stage may be employed. The dense optimization stage seeks to optimize the shape of the model to match the shape of the user as represented by the point cloud data. This may be accomplished minimizing the distance between the model and the point cloud data so the shape of the model is adjusted to be closer to the shape of the point cloud. In some embodiments, the dense optimization stage may involve multiple parts.

In one or more embodiments, a first part of the dense optimization stage may involve the sum of chamfer distances between reference point cloud and the subset of vertices for each partial scan. Minimizing the sum of chamfer distances may increase the similarity of the mesh vertices to the reference point clouds. The subset of vertices for each partial scan is selected from the area of a body which are likely to be covered by the partial scan. The prior knowledge of the rotation order and degree are used to select the subset. A certain level of delta regarding the degree of rotation may be tolerated due to the global rotation and translation parameters in the parameters space. The second part of the dense optimization stage may involve a regularization parameter for a common shape coefficient. The regularization parameter may provide a balance between overfitting and underfitting. The third part of the dense optimization stage may involve a regularization term for one or more pose parameters. The regularization term may prevent the optimization from outputting excessively large rotation angles that are not physically possible by human joints. The fourth part of the dense optimization stage may involve calculating the Euclidean distance between the pose parameters included within a front scan of the user by the camera, and any other scans of the user obtained by the camera. This is based on the prior information that user has very similar pose for each of the partial scan, "A-pose" in the experience setup. The parameter is used control the amount of delta to allow between each scan.

In one or more embodiments, minimizing the sum of chamfer distances may increase the similarity of the mesh vertices to the reference point clouds. The subset of vertices for each partial scan may be selected from the area of a body which are likely to be covered by the partial scan. The prior knowledge of the rotation order and degree may be used to select the subset. A certain level of delta regarding the degree of rotation can be tolerated due to the global rotation and translation parameters in the parameters space.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is an example system 100 for generating a full-body reconstruction using a single camera, according to some example embodiments of the present disclosure.

Referring to FIG. 1, the system 100 may include a person 102 of whom images may be captured by a camera 104. The camera 104 may have light detection and ranging (LIDAR)

capabilities with which to capture depth data used to generate a point cloud (e.g., three-dimensional data points in a coordinate system). From the data captured by the camera 104, representations 105 of the person 102 may include point clouds of the person 102 (e.g., point cloud 106, point cloud 108, point cloud 110, point cloud 112, etc., representing point clouds at various times when images of the person 102 are captured). The representations 105 may represent an initial state of the person 102, including the point clouds and their key points representing coordinates of body points of the person 102. A human body model 116 may be combined with the point clouds of the person 102 to adjust the human body model 116 to be as similar to the point clouds of the person 102 as possible. Representations 120 show both the point clouds and the human body model 116 overlaying one another. Key points 130 (e.g., the dots representing coordinates of the point clouds and the human body model 116) are shown. The point clouds may require rotation and translation to align the key points 130 of the point clouds and of the human body model 116. The system 100 may perform optimization of the human body model 116 as described further herein to generate optimized human body models 140 whose distances from the point clouds of the person 102 are minimized.

In one or more embodiments, the person 102 may rotate their body, allowing the camera to perform multiple scans at different rotation points (e.g., front, 45 degrees left, 45 degrees right, and back). The partial scans may represent the four versions of the point clouds shown.

It is understood that the above descriptions are for purposes of illustration and are not meant to be limiting.

Figure 2:
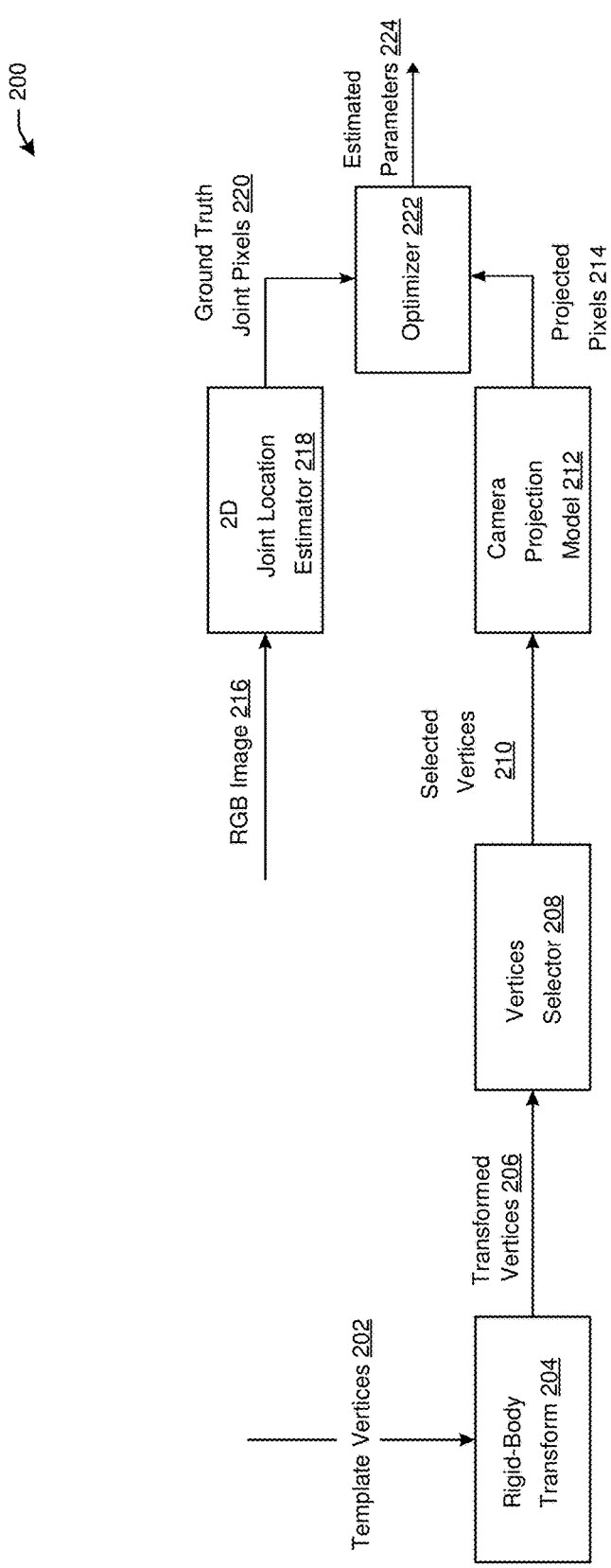
FIG. 2 is a block diagram of a process for generating a full-body reconstruction using a single camera, in accordance with one or more example embodiments of the present disclosure.

FIG. 2 is a block diagram of a process 200 for generating a full-body reconstruction using a single camera, in accordance with one or more example embodiments of the present disclosure.

Referring to FIG. 2, the process 200 may input template vertices 202 (e.g., vertices of a template, such as the human body model 116 of FIG. 1) into a rigid body transform 203, which may transform the template vertices 202 (e.g., using rotation and translation parameters) without deforming them. The transformed vertices 206 may be input to a vertices selector 208 to generate selected vertices 210 by selecting vertices (e.g., x,y,z coordinates) having anatomical correspondence to the key points of the point clouds of a person (e.g., as shown in FIG. 1). The selected vertices 210 may be input to a camera projection model 212 to generate projected pixels 214 (u',v') by projecting the selected vertices 210 into two-dimensional space using the camera projection model 212.

Still referring to FIG. 2, RBG image data 216 may be input to a 2D joint location estimator 218 (e.g., OpenPose), to generate ground truth pixels 220 (u,v). The projected pixels 214 and the ground truth pixels 220 may be input to an optimizer 222. The optimizer 222 may search the rotation and translation parameters to minimize the error between the projected pixels 214 and the ground truth pixels 220. The initial translation value may be set to 1 meter or some other value, for example (e.g., based on the distance of the person 102 from the camera 104). The optimizer 222 may use a multi-stage optimization process to generate estimated parameters 224 (e.g., the rotation and translation parameters) to which to apply to the human body model 116 to adjust the human body model 116 to be similar to the point clouds of a person.

In one or more embodiments, the parameter space may be represented by $\vec{x}=[R_1, t_1, \theta_1, R_2, t_2, \theta_2, R_3, t_3, \theta_3, R_4, t_4, \theta_4, \beta]$, where $R_i \in R^3$, $t_i \in R^3$ are global rotation and translation parameters of the SMPL model for partial data i, $\theta_i \in R^{3 \times 23}$ are Euler angle representations of the rotation of joints relative to a parent joint for partial data i, and $\beta \in R^{300}$ are a common set of shape coefficients shared by the partial data of each scan performed by the camera 104 of FIG. 1. An SMPL model may be used as the template from which the template vertices 202 are selected. Pose parameters of the model are Euler angles of the rotation of joints relative to respective parent joints. The coefficients are a regression of a linear model that estimates the location of the template vertices 202.

In one or more embodiments, the system 100 may guess initial values for $R_i$ and $t_i$ (the rotation and translation parameters).

Figure 3:
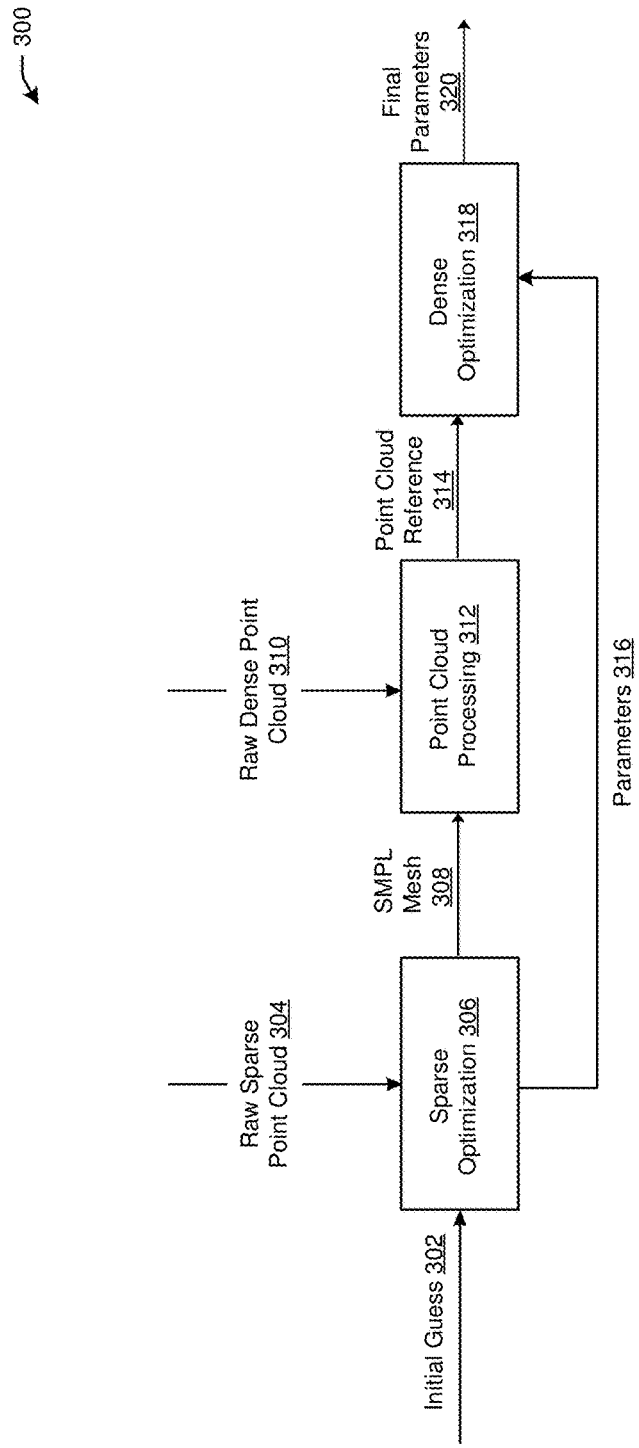
FIG. 3 is a block diagram of a process for the optimization step of FIG. 2, in accordance with one or more example embodiments of the present disclosure.

FIG. 3 is a block diagram of a process 300 for the optimization step of FIG. 2, in accordance with one or more example embodiments of the present disclosure.

Referring to FIG. 3, the process 300 may represent the optimization performed by the optimizer 222 of FIG. 2. As shown, the estimated parameters 224 of FIG. 2 and a raw parse point cloud 304 (e.g., from the camera 104 of FIG. 1) may be inputs to a sparse optimization 306. The sparse optimization 306 may generate an SMPL mesh 308 (e.g., an updated version of the human body model 116 of FIG. 1). The SMPL mesh 308 and a raw dense point cloud 310 (e.g., from the camera 104 of FIG. 1) may be inputs to point cloud processing 312, which may use a KNN technique to remove noise from the raw dense point cloud 310. The result may be a point cloud reference 314 that is an input, along with parameters 316 generated by the sparse optimization 306, to a dense optimization 318. The dense optimization 318 may capture detailed shape features of a scanned person (e.g., the person 102 of FIG. 1), which is not possible with the sparse optimization 306 alone. The output of the dense optimization 318 may be the final parameters 320 (e.g., $R_1, t_1, \theta_1, R_2, t_2, \theta_2, R_3, t_3, \theta_3, R_4, t_4, \theta_4, \beta$) with which to apply to the human body model 116.

In one or more embodiments, the process 300 may let $SMPL(\theta_i, \beta)$ be the SMPL function, which takes pose parameters and shape coefficients as inputs and generates 3D coordinates of vertices $V \in R^{N \times 3}$ as outputs, where N is the number of vertices. The process 300 may let Sub Set(V, I) be a function to select a subset of vertices V by indices I. The process 300 may let $V_i^{ref}$ be the sparse point cloud reference from partial scan i. The process 300 may let $L1(V^{ref}, V)$ be the function which determines the L1 norm of the residual between $V^{ref}$ and V. The cost functions for the sparse optimization are defined as: $Loss(\vec{x})_{sparse} = \sum_{i=1}^{4} L1(V_i^{ref}, SubSet(SMPL(\theta_i, \beta), I_i^{sparse})) + \lambda^{sparse}\|\beta\|_2 + \gamma^{sparse}\sum_{i=1}^{4}\|\theta_i\|_2 + \rho^{sparse}\sum_{i=2}^{4}\|\theta_i - \theta_1\|_2$.

In one or more embodiments, the cost function is composed of four parts for sparse optimization. The first part is the sum of L1 norm of the residual between $V_i^{ref}$ and $V_i$ for each partial scan. $V_i^{ref}$ is the joint location obtained after RGB and depth alignment. $V_i$ represents the corresponding vertices selected from the deformable template. The second part is a L2 regularization term for the common shape coefficient. The $\lambda^{sparse}$ is a regularization parameter to balance between overfitting and under-fitting. The third part is a L2 regularization term for the pose parameters. The $\gamma^{sparse}$ is a regularization parameter to prevent the optimization from outputting excessively large rotation angles that not physically possible by human joints. The fourth part is calculating the Euclidean distance between of the pose parameters between the front scan and the remaining scans.

This is based on the prior information that user has very similar pose for each of the partial scan, an "A-pose" in the setup. The hyper parameter $\rho^{sparse}$ is to control how large of a delta to allow between partial scans. $I_i^{sparse}$ is the indices of vertices from SMPL model which has anatomical correspondence to the detected 2D key points from the RGB image data 216 of FIG. 2.

There are two responsibilities of the point cloud processing 312 step: (1) Remove noise from the point cloud; and (2) select vertices from SMPL mesh template for dense optimization. Because of the sparse optimization, the process 300 may perform both noise removal and vertices selection by a KNN algorithm. In an experimental setup, the process 300 may set K=1 and d=0.05, where K is the number of nearest neighbor, and d is the distance threshold. Both K and d are hyperparameters, which may be fine-tuned through cross-validation.

A purpose of the dense optimization 318 is to capture the detailed shape features of the scanned person, which is not possible with the sparse optimization 306. The process 300 may let SMPL($\theta_i$, $\beta$) be the SMPL function, which takes pose parameters and shape coefficients as inputs and generates 3D coordinates of vertices $V \in R^{N \times 3}$ as output, where N is the number of vertices. The process 300 may let SubSet(V, I) be a function to select a subset of vertices V by indices I. The process 300 may let $PC_i^{ref}$ be the dense point cloud reference from partial scan i. The process 300 may let Chamfer($PC^{ref}$, PC) be the function to determine the chamfer distance between two given point clouds. By the definition of chamfer distance, minimizing the chamfer distance between two point-clouds is equal to increasing the similarity of the two point-clouds. The cost functions for the dense optimization defined as: $Loss(\vec{x})_{dense} = \Sigma_{i=1}^{4} Chamfer(PC_i^{ref}, SubSet(SMPL(\theta_i,\beta)I_i^{dense})) + \lambda^{dense}\|\beta\|_2 + \gamma^{dense}\Sigma_{i=1}^{4}\|\theta_i\|_2 + \rho^{dense}\Sigma_{i=2}^{4}\|\theta_i-\theta_1\|_2$.

In one or more embodiments, the cost function includes four parts for the dense optimization 318. The first part is the sum of chamfer distances between a reference point cloud and the subset of vertices for each partial scan. Minimizing the sum will increase the similarity of the mesh vertices to the reference point clouds. The subset of vertices for each partial scan is selected from the area of a body which are likely to be covered by the partial scan. The prior knowledge of the rotation order and degree are used to select the subset. The degree of rotation may not be precise; a certain level of delta may be tolerated due to the global rotation and translation parameters in the parameters space. The second part is a L2 regularization term for the common shape coefficient. The $\lambda^{dense}$ is a regularization parameter to balance between overfitting and underfitting. The process 300 may set $\lambda^{dense} < \lambda^{sparse}$ in the experiment to less regulate the shape coefficient for better shape feature capturing. The third part is a L2 regularization term for the pose parameters. The $\gamma^{dense}$ is a regularization parameter to prevent the optimization from outputting excessively large rotation angles that are not physically possible by human joints. The process 300 may set $\gamma^{dense} = \gamma^{sparse}$ in the experiment. The fourth part is calculating the Euclidean distance between of the pose parameters between the front scan and the rest of scans. This is based on the prior information that user has very similar pose for each of the partial scan, A-pose in the setup. The hyper parameter $\rho^{dense}$ is to control how big delta we allow between each scan. The process 300 may set $\rho^{dense} = \rho^{sparse}$ in the experiment. $I_i^{dense}$ are the indices of vertices from SMPL model which qualify the KNN threshold in point cloud processing 312 step.

Figure 4:
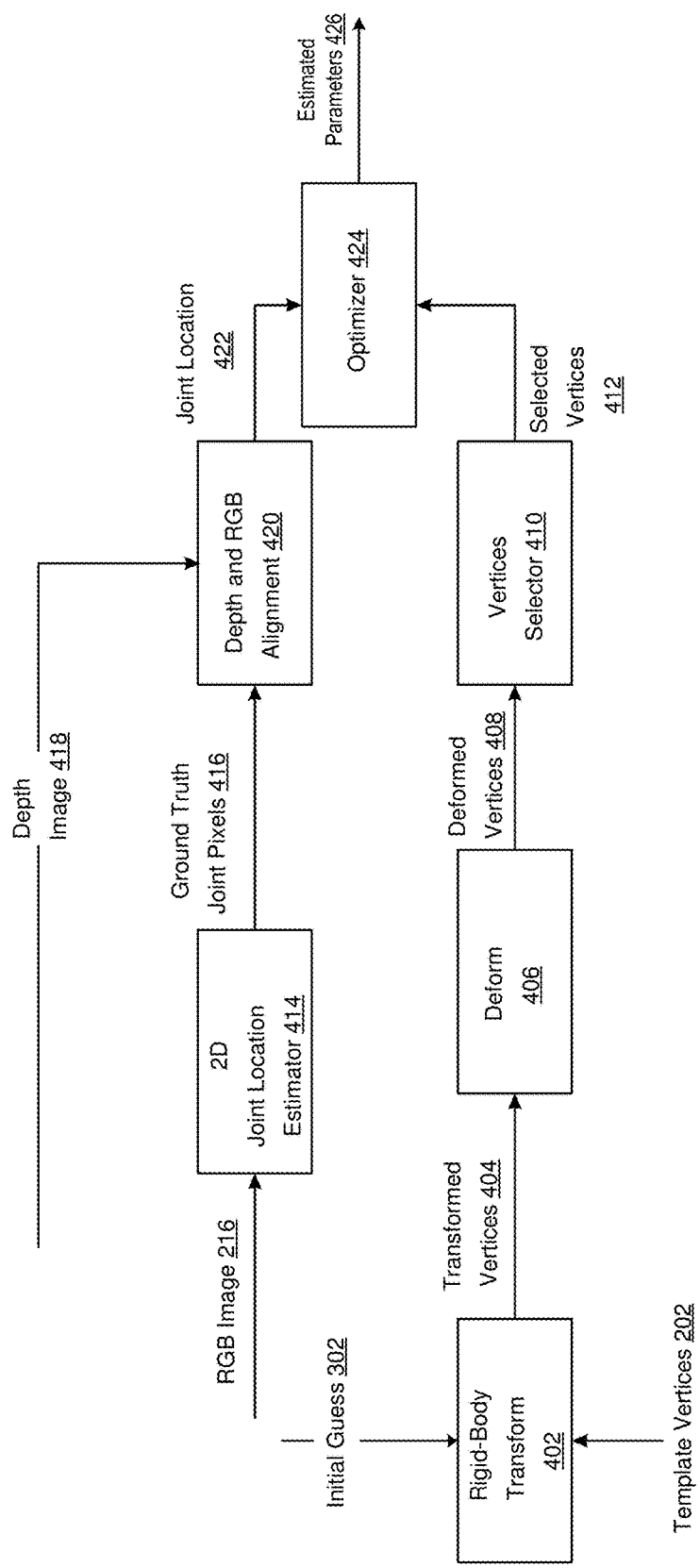
FIG. 4 is a block diagram of a process for the sparse optimization of FIG. 3, in accordance with one or more example embodiments of the present disclosure.

FIG. 4 is a block diagram of a process 400 for the sparse optimization of FIG. 3, in accordance with one or more example embodiments of the present disclosure.

Referring to FIG. 4, the process 400 may represent the sparse optimization 306 step of FIG. 3, and may include inputting the template vertices 202 of FIG. 2 and the estimated parameters 224 of FIG. 2 into a rigid-body transform 402. The rigid-body transform 402 may generate transformed vertices 404 to be input to a deform step 406, in which deformed vertices 408 are generated and input to a vertices selector 410, which may generate selected vertices 412, $V_i$, by selection from a deform template. The RGB image data 216 may be input to a 2D joint location estimator 414 (e.g., OpenPose), which may generate ground truth pixels 416 (u,v) for the body joints. The ground truth pixels 416 may be input, along with depth image data 418 (e.g., point cloud data from the camera 104, such as the raw sparse point cloud 304 and/or the raw dense point cloud 310 of FIG. 3) to a depth and RGB alignment step 420. The depth and RGB alignment step 420 may reuse the estimated 2D joint pixel location (u,v) to obtain a reference 3D joint location 422 by aligning the depth image data 418 and the ground truth joint pixels 416 using extrinsic data from camera calibration. An optimizer 424 searches over the entire parameter space to minimize the L1 norm of the residual between the reference 3D joint location 422 and selected vertices 412. The L1 norm may be used instead of the L2 norm because using L1 norm makes the algorithm more robust for outliers than the L2 norm. The outlier may be caused by misalignment, occlusion, or noise in the depth image data 418. The optimizer 424 may generate estimated parameters 426 (e.g., $R_1$, $t_1$, $\theta_1$, $R_2$, $t_2$, $\theta_2$, $R_3$, $t_3$, $\theta_3$, $R_4$, $t_4$, $\theta_4$, $\beta$) with which to apply to the human body model 116.

Figure 5:
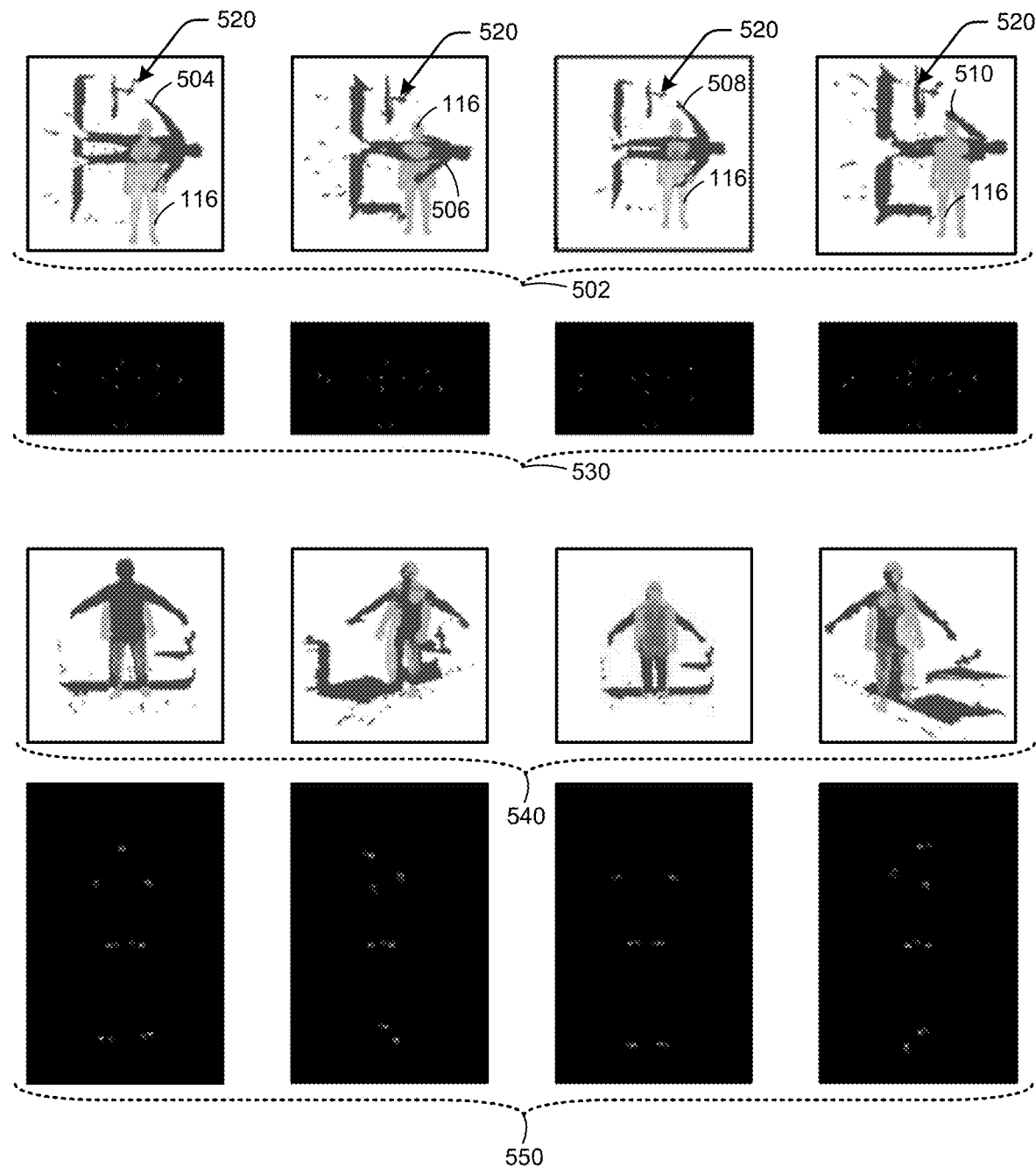
FIG. 5 shows exemplary initial states and initial guesses for parameters used for generating a full-body reconstruction using a single camera, in accordance with one or more example embodiments of the present disclosure.

FIG. 5 shows exemplary initial states and initial guesses for parameters used for generating a full-body reconstruction using a single camera, in accordance with one or more example embodiments of the present disclosure.

Referring to FIG. 5, initial states 502 may include both point clouds (e.g., point cloud 504, pout cloud 506, point cloud 508, and point cloud 510, representing point clouds from four respective images of a person) and the human body model 116. As shown, the point cloud data may include some noise (e.g., noise 520, representing objects in the images from which the point clouds are generated). As also shown, the human body model 116 and the respective point clouds may require some rotation and translation to align. The point clouds and the human body model 116 may have key points 530 (e.g., the respective dots indicate key points of the body parts of the point clouds and the human body model 116). Initial guesses 540 (e.g., representing the estimated parameters 224 of FIG. 2) of the rotation and translation parameters also are shown along with their respective key points 550. The initial guesses 540 of the rotation and translation parameters may be applied to align the respective point clouds with the human body model 116 (e.g., align the key points). The initial guesses 540 may be generated based on the process 200 of FIG. 2.

Due to the non-convexity of the optimization problem, initial values for the parameters (e.g., the initial guess 540) are important for convergence speed and the optimality of the result. The initial guess 540 for $R_1$ and $t_1$ may be generated using the process 200 of FIG. 2. A RGB image $Img_x$ is provided to a 2D joint location estimator, such as OpenPose, to generate the ground truth pixels (u,v). The estimated pixels(u',v') is calculated by applying $R_x$, $t_x$ to the vertices of mesh, select vertices which has anatomical correspondence to the keypoints, then project the selected vertices into 2D using camera projection model. The optimizer searches $R_x$, $t_x$ to minimize the error between GT (u,v) and estimated (u',v'). In this step, the mesh is not deformed but only rigidly transformed. The initial value of $t_x$ is set to 1 meter (e.g., or whatever distance of the person from the camera when the images are captured).

Figure 6:
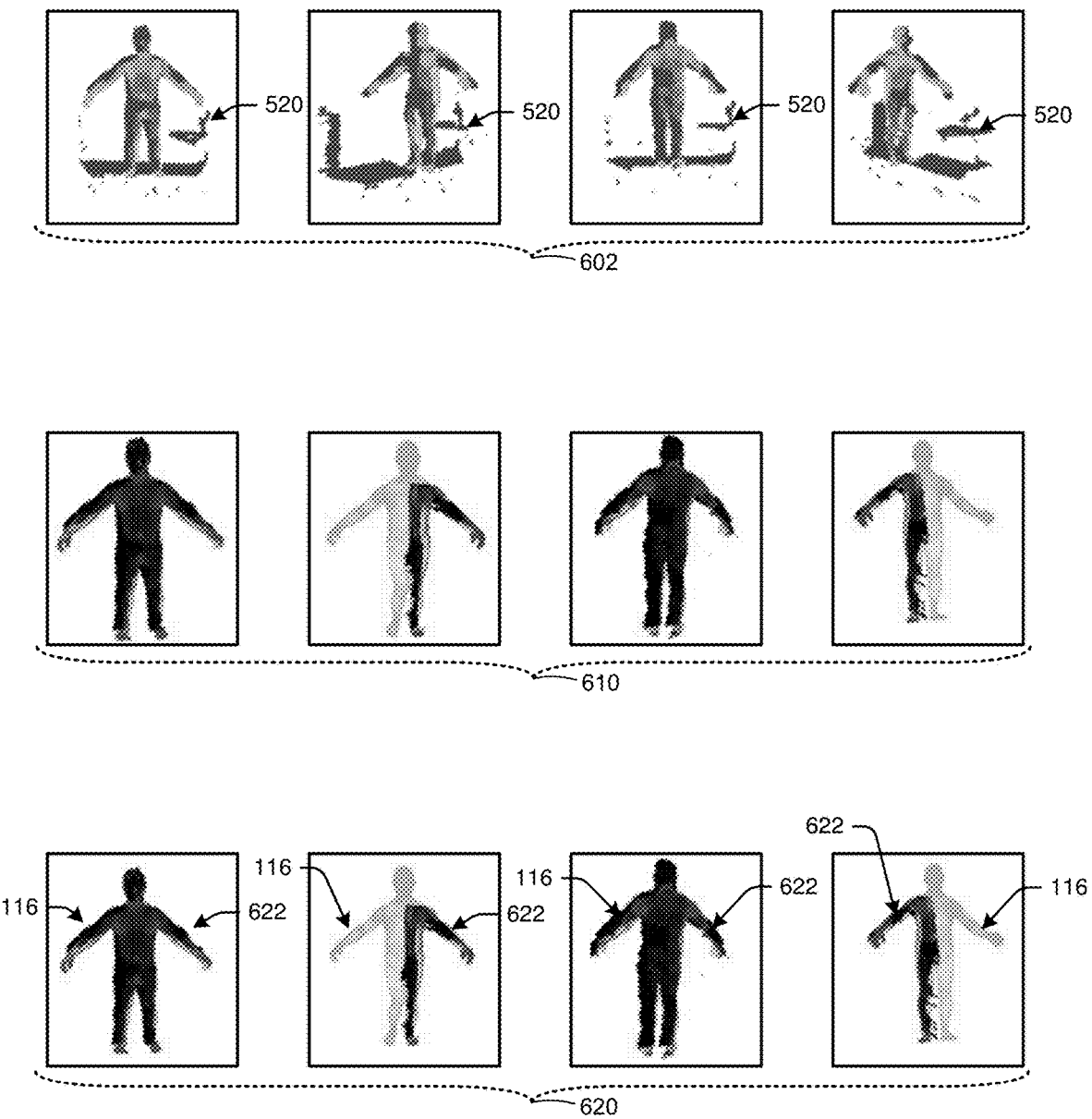
FIG. 6 shows exemplary outputs for sparse optimization, point cloud processing, and dense optimization used for generating a full-body reconstruction using a single camera, in accordance with one or more example embodiments of the present disclosure.

FIG. 6 shows exemplary outputs for sparse optimization, point cloud processing, and dense optimization used for generating a full-body reconstruction using a single camera, in accordance with one or more example embodiments of the present disclosure.

Referring to FIG. 6, outputs 602 of sparse optimization (e.g., the sparse optimization 306 of FIG. 3) are shown, representing the SMPL mesh 308 of FIG. 3 (e.g., an improved template to more closely align the human body model 116 of FIG. 1 to the point clouds of FIG. 5). The noise 520 of FIG. 5 is shown and still may be present after sparse optimization. Outputs 610 of point cloud processing (e.g., the point cloud processing 312 of FIG. 3), representing the point cloud references 314 of FIG. 3, also are shown, and from which the noise 520 may be removed (e.g., using a K-nearest neighbors technique). Also shown are outputs 620 of the dense optimization (e.g., the dense optimization 318 of FIG. 3), representing the final parameters 320 of FIG. 3. The purpose of the dense optimization is to capture the detailed shape features of the scanned person, which is not possible with the sparse optimization. In this manner, the outputs 620 may provide the final parameters 320 with which to apply to the human body model 116 to best align the human body model 116 to the point clouds of a person captured in images. As shown, the outputs 620 provide a close alignment of the human body model 116 to the point clouds, rendering the human body model 116 optimized for a given person in three dimensional space based on two-dimensional camera data from a stationary camera.

Figure 7:
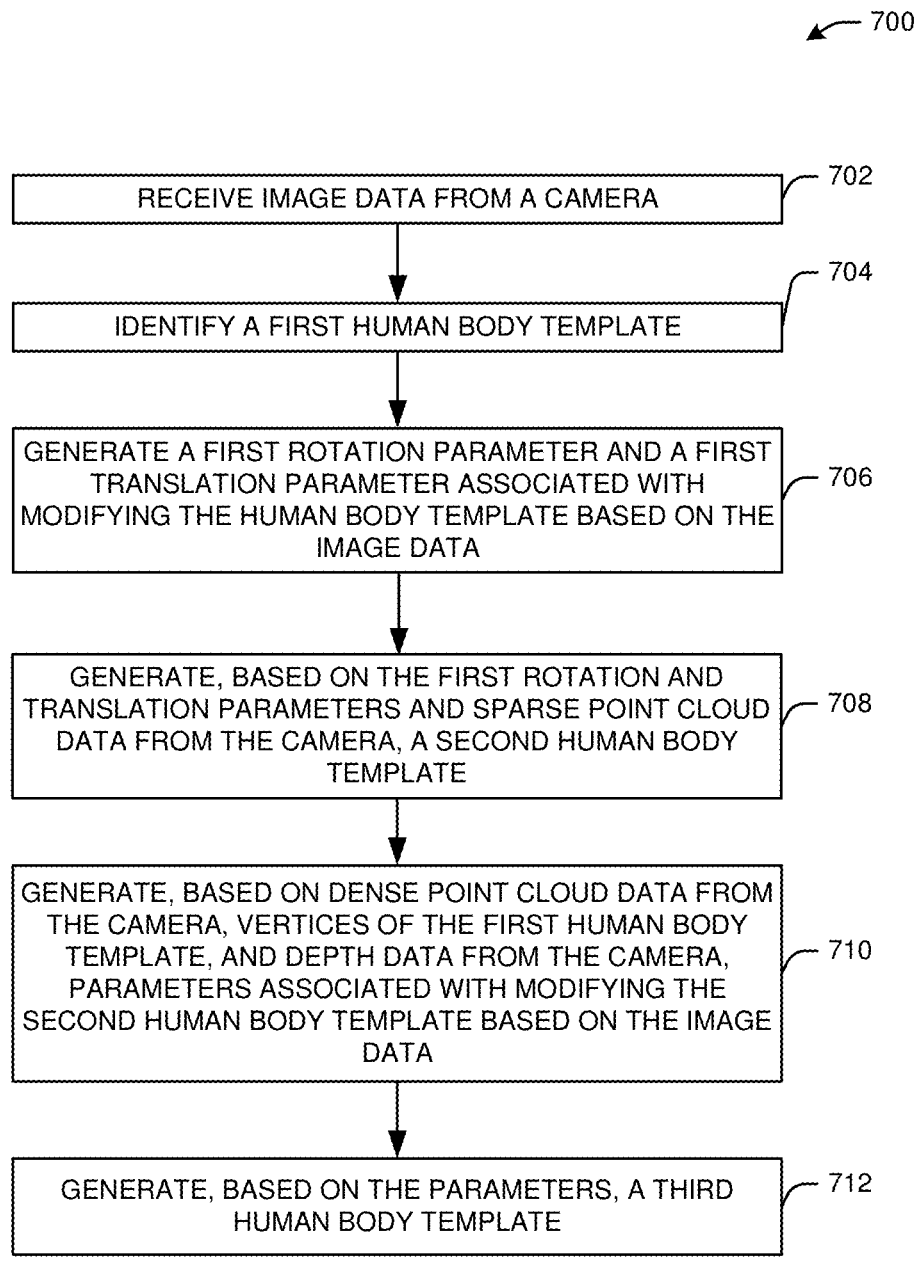
FIG. 7 illustrates a flow diagram of an illustrative process for generating a full-body reconstruction using a single camera, in accordance with one or more example embodiments of the present disclosure.

FIG. 7 illustrates a flow diagram of an illustrative process 700 for generating a full-body reconstruction using a single camera, in accordance with one or more example embodiments of the present disclosure.

At block 702, a device (e.g., the camera 104 of FIG. 1, the one or more pose devices 819 of FIG. 8) may receive data from a camera (e.g., the camera 104). The camera may be stationary and the only source of the data (e.g., the data may not be provided by a camera that rotates around a person or by multiple cameras). In this manner, the data may include data from multiple scans, each of which may be partial (e.g., from different respective scans at different rotation points with respect to the person whose images are captured). The data may include 2D RBG-D data, which may be time-stamped, and depth data (e.g., point cloud data). The data may be captured at different rotation points because the person may rotate, allowing the camera to remain stationary while scanning at different angles with respect to the person (e.g., as opposed to a 360-degree body scan from a moving camera that rotates around the person's body).

At block 704 the device may identify a first human body template, such as an SMPL model as a parametric mesh representing body parts of a person. The first human body template may be based on the person represented by the camera data or based on another person. Pose parameters of the first human body template may include Euler angles of rotation of body joints relative to parent body joints, and shape coefficients. The first human body template may differ from the image data. For example, the coordinates of the vertices of the first human body template may be different than the coordinates of the corresponding body parts of the person represented by the image data.

At block 706, the device may generate, based on a comparison of the first human body template and the first point cloud data, parameters associated with the body joints represented by the human body template. The point cloud data and two dimensional RGB pixel data from the camera may be aligned by the device to generate a 3D joint location of the body joints represented by the point cloud and image data. The device may select 3D vertices from the first human body template. The device may generate the parameters to minimize the difference between actual pixel locations of the body joints represented by the point cloud and image data and the estimated pixel values of the selected vertices from the first human body template. The optimization of the parameters may include both sparse and dense optimization, using sparse point cloud data and dense point cloud data, respectively. The device may reduce noise in the dense point cloud data using a KNN technique.

At block 708, the device may generate one or more additional human body templates based on the optimized parameters. In this manner, the device may generate the one or more additional human body templates using the respective parameters so that the one or more additional human body templates are close (e.g., in coordinate distance of the key points represented by body joints) to the point cloud data. In particular, due to the dense optimization, the body shape of the one or more additional human body templates may be more closely aligned with the actual body shape of the person represented by the camera data (e.g., rather than simply aligning the joints, the one or more additional human body templates also capture the person's body shape, which may differ from the body shape represented by the first human body template prior to optimization).

At block 710, optionally, the device may present the one or more additional human body templates so that a user may see the full-body reconstruction represented by the one or more additional human body templates. In this manner, a person may have a camera take multiple scans from different angles by rotating in front of the camera, and may be presented with a 3D reconstruction of their body shape.

It is understood that the above descriptions are for purposes of illustration and are not meant to be limiting.

Figure 8:
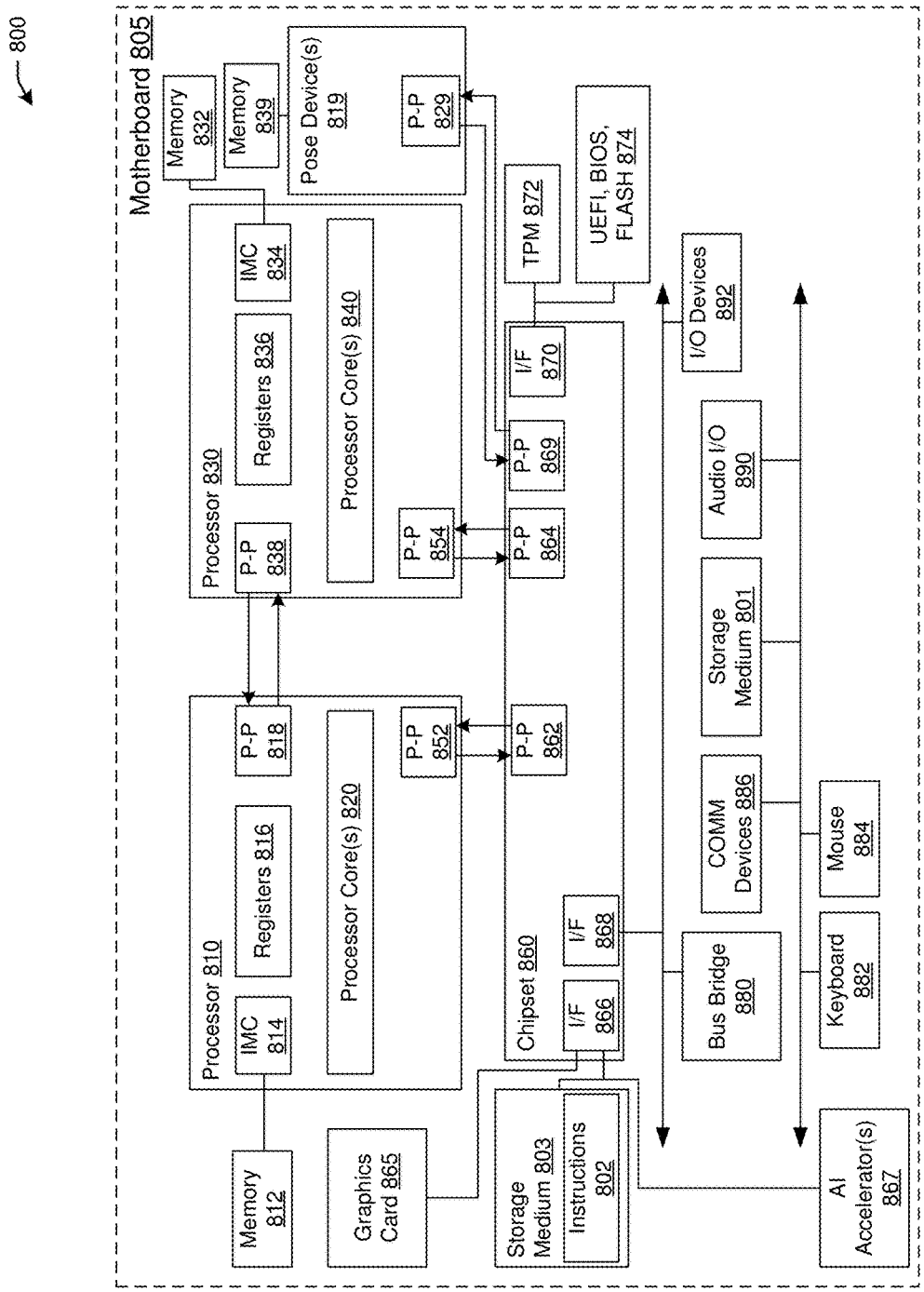
FIG. 8 illustrates an embodiment of an exemplary system, in accordance with one or more example embodiments of the present disclosure.

FIG. 8 illustrates an embodiment of an exemplary system 800, in accordance with one or more example embodiments of the present disclosure.

In various embodiments, the system 800 may comprise or be implemented as part of an electronic device.

In some embodiments, the system 800 may be representative, for example, of a computer system that implements one or more components and/or functions of FIGS. 2-4, and may be implemented at least partially within the camera 104 of FIG. 1, or may be implemented in another device that receives data from the camera.

The embodiments are not limited in this context. More generally, the system 800 is configured to implement all logic, systems, processes, logic flows, methods, equations, apparatuses, and functionality described herein and with reference to the figures.

The system 800 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other devices for processing, displaying, or transmitting information. Similar embodiments may comprise, e.g., entertainment devices such as a portable music player or a portable video player, a smartphone or other cellular phones, a telephone, a digital video camera, a digital still camera, an external storage device, or the like. Further embodiments implement larger-scale server configurations. In other embodiments, the system 800 may have a single processor with one core or more than one processor. Note that the term "processor" refers to a processor with a single core or a processor package with multiple processor cores.

In at least one embodiment, the computing system 800 is representative of one or more components and/or functions performed in FIGS. 2-4. More generally, the computing system 800 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 800. For example, a component can be but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 800 comprises a motherboard 805 for mounting platform components. The motherboard 805 is a point-to-point (P-P) interconnect platform that includes a processor 810, a processor 830 coupled via a P-P interconnects/interfaces as an Ultra Path Interconnect (UPI), and one or more pose devices 819 (e.g., capable of performing the processes of FIGS. 2-4 and 7). In other embodiments, the system 800 may be of another bus architecture, such as a multi-drop bus. Furthermore, each of processors 810 and 830 may be processor packages with multiple processor cores. As an example, processors 810 and 830 are shown to include processor core(s) 820 and 840, respectively. While the system 800 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 810 and the chipset 860. Some platforms may include additional components and some platforms may only include sockets to mount the processors and/or the chipset.

The processors 810 and 830 can be any of various commercially available processors, including without limitation an Intel® Celeron®, Core®, Core (2) Duo®, Itanium®, Pentium®, Xeon®, and XScale® processors; AMD® Athlon®, Duron®, and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 810, and 830.

The processor 810 includes an integrated memory controller (IMC) 814 and P-P interconnects/interfaces 818 and 852. Similarly, the processor 830 includes an IMC 834 and P-P interconnects/interfaces 838 and 854. The WIC's 814 and 834 couple the processors 810 and 830, respectively, to respective memories, a memory 812, and a memory 832. The memories 812 and 832 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 812 and 832 locally attach to the respective processors 810 and 830.

In addition to the processors 810 and 830, the system 800 may include the one or more pose devices 819. The one or more pose devices 819 may be connected to chipset 860 by means of P-P interconnects/interfaces 829 and 869. The one or more pose devices 819 may also be connected to a memory 839. In some embodiments, the one or more pose devices 819 may be connected to at least one of the processors 810 and 830. In other embodiments, the memories 812, 832, and 839 may couple with the processor 810 and 830, and the one or more pose devices 819 via a bus and shared memory hub.

System 800 includes chipset 860 coupled to processors 810 and 830. Furthermore, chipset 860 can be coupled to storage medium 803, for example, via an interface (I/F) 866. The I/F 866 may be, for example, a Peripheral Component Interconnect-enhanced (PCI-e). The processors 810, 830, and the one or more pose devices 819 may access the storage medium 803 through chipset 860.

Storage medium 803 may comprise any non-transitory computer-readable storage medium or machine-readable storage medium, such as an optical, magnetic, or semiconductor storage medium. In various embodiments, storage medium 803 may comprise an article of manufacture. In some embodiments, storage medium 803 may store computer-executable instructions, such as computer-executable instructions 802 to implement one or more of processes or operations described herein, (e.g., process 700 of FIG. 7). The storage medium 803 may store computer-executable instructions for any equations depicted above. The storage medium 803 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 810 couples to a chipset 860 via P-P interconnects/interfaces 852 and 862 and the processor 830 couples to a chipset 860 via P-P interconnects/interfaces 854 and 864. Direct Media Interfaces (DMIs) may couple the P-P interconnects/interfaces 852 and 862 and the P-P interconnects/interfaces 854 and 864, respectively. The DMI may be a high-speed interconnect that facilitates, e.g., eight Giga Transfers per second (GT/s) such as DMI 3.0. In other embodiments, the processors 810 and 830 may interconnect via a bus.

The chipset 860 may comprise a controller hub such as a platform controller hub (PCH). The chipset 860 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 860 may comprise more than one controller hub such as a chipset with a memory controller hub, a graphics controller hub, and an input/output (I/O) controller hub.

In the present embodiment, the chipset 860 couples with a trusted platform module (TPM) 872 and the UEFI, BIOS, Flash component 874 via an interface (I/F) 870. The TPM 872 is a dedicated microcontroller designed to secure hardware by integrating cryptographic keys into devices. The UEFI, BIOS, Flash component 874 may provide pre-boot code.

Furthermore, chipset 860 includes the I/F 866 to couple chipset 860 with a high-performance graphics engine, graphics card 865. In other embodiments, the system 800 may include a flexible display interface (FDI) between the processors 810 and 830 and the chipset 860. The FDI interconnects a graphics processor core in a processor with the chipset 860.

Various I/O devices 892 couple to the bus 881, along with a bus bridge 880 that couples the bus 881 to a second bus 891 and an I/F 868 that connects the bus 881 with the chipset 860. In one embodiment, the second bus 891 may be a low pin count (LPC) bus. Various devices may couple to the second bus 891 including, for example, a keyboard 882, a mouse 884, communication devices 886, a storage medium 801, and an audio I/O 890.

The artificial intelligence (AI) accelerator 867 may be circuitry arranged to perform computations related to AI. The AI accelerator 867 may be connected to storage medium 801 and chipset 860. The AI accelerator 867 may deliver the processing power and energy efficiency needed to enable abundant data computing. The AI accelerator 867 is a class of specialized hardware accelerators or computer systems designed to accelerate artificial intelligence and machine learning applications, including artificial neural networks and machine vision. The AI accelerator 867 may be applicable to algorithms for robotics, internet of things, other data-intensive and/or sensor-driven tasks.

Many of the I/O devices 892, communication devices 886, and the storage medium 801 may reside on the motherboard 805 while the keyboard 882 and the mouse 884 may be add-on peripherals. In other embodiments, some or all the I/O devices 892, communication devices 886, and the storage medium 801 are add-on peripherals and do not reside on the motherboard 805.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions that, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. Integrated circuits, processor packages, chip packages, and chipsets may comprise one or more processors.

Processors may receive signals such as instructions and/or data at the input(s) and process the signals to generate at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Example 1 may be a method for generating a full-body reconstruction using data from a camera, the method comprising: receiving, by at least one processor of a device, first point cloud data from the camera, the first point cloud data representing a person; identifying, by the at least one processor, a first human body template, the first human body template representing body joints; generating, by the at least one processor, based on a comparison of the first human body template to the first point cloud data, parameters associated with the body joints; and generating, by the at least one processor, based on the parameters, a second human body template representing the person.

Example 2 may include the method of example 1 and/or some other example herein, further comprising: generating, based on a comparison of the second human body template to second point cloud data from the camera, a third human body template representing the person.

Example 3 may include the method of example 2 and/or some other example herein, further comprising: reducing noise from third point cloud data by applying a k-nearest neighbors technique to the third point cloud data to generate the second point cloud data.

Example 4 may include the method of example 1 and/or some other example herein, further comprising: generating three-dimensional joint locations of the person based on the first point cloud data and two-dimensional pixel data from the camera, wherein generating the second human body template is further based on the three-dimensional joint locations.

Example 5 may include the method of example 1 and/or some other example herein, wherein the first point cloud data is from a first image of multiple images of the person received from the camera, and wherein the camera is a sole source of the multiple images.

Example 6 may include the method of example 5 and/or some other example herein, wherein the images are indicative of rotation of the person.

Example 7 may include the method of example 1 and/or some other example herein, further comprising: receiving second point cloud data from the camera, the second point cloud data representing the person; determining a chamfer distance between the first point cloud data and the second point cloud data; and generating, based on the chamfer distance, a third human body template representing the person.

Example 8 may include the method of example 1 and/or some other example herein, wherein the first human body template is a Skinned Multi-Person Linear (SMPL) model.

Example 9 may include a non-transitory computer-readable medium storing computer-executable instructions which when executed by one or more processors result in performing operations comprising: receiving first point cloud data from a camera, the first point cloud data representing a person; identifying a first human body template, the first human body template representing body joints; generating, based on a comparison of the first human body template to the first point cloud data, parameters associated with the body joints; and generating, based on the parameters, a second human body template representing the person.

Example 10 may include the non-transitory computer-readable medium of example 9 and/or some other example herein, the operations further comprising generating, based on a comparison of the second human body template to second point cloud data from the camera, a third human body template representing the person.

Example 11 may include the non-transitory computer-readable medium of example 9 and/or some other example herein, the operations further comprising reducing noise from third point cloud data by applying a k-nearest neighbors technique to the third point cloud data to generate the second point cloud data.

Example 12 may include the non-transitory computer-readable medium of example 9 and/or some other example herein, the operations further comprising generating three-dimensional joint locations of the person based on the first point cloud data and two-dimensional pixel data from the camera, wherein generating the second human body template is further based on the three-dimensional joint locations.

Example 13 may include the non-transitory computer-readable medium of example 9 and/or some other example herein, wherein the first point cloud data is from a first image of multiple images of the person received from the camera, and wherein the camera is a sole source of the multiple images.

Example 14 may include the non-transitory computer-readable medium of example 13 and/or some other example herein, wherein the images are indicative of rotation of the person.

Example 15 may include the non-transitory computer-readable medium of example 13 and/or some other example herein, the operations further comprising determining a chamfer distance between the first point cloud data and the second point cloud data; and generating, based on the chamfer distance, a third human body template representing the person.

Example 16 may include a device for generating a full-body reconstruction using image data from a single camera, the device comprising at least one processor coupled to memory, the at least one processor configured to: receive first point cloud data from the camera, the first point cloud data representing a person; identify a first human body template, the first human body template representing body joints; generate, based on a comparison of the first human body template to the first point cloud data, parameters associated with the body joints; and generate, based on the parameters, a second human body template representing the person.

Example 17 may include the device of example 16 and/or some other example herein, wherein the at least one processor is further configured to generate, based on a comparison of the second human body template to second point cloud data from the camera, a third human body template representing the person.

Example 18 may include the device of example 17 and/or some other example herein, wherein the at least one processor is further configured to reduce noise from third point cloud data by applying a k-nearest neighbors technique to the third point cloud data to generate the second point cloud data.

Example 19 may include the device of example 16 and/or some other example herein, wherein the at least one processor is further configured to: generate three-dimensional joint locations of the person based on the first point cloud data and two-dimensional pixel data from the camera, wherein to generate the second human body template is further based on the three-dimensional joint locations.

Example, 20 may include the device of example 16 and/or some other example herein, wherein the at least one processor is further configured to: receive second point cloud data from the camera, the second point cloud data representing the person; determine a chamfer distance between the first point cloud data and the second point cloud data; and generate, based on the chamfer distance, a third human body template representing the person.

Example 21 may include an apparatus comprising means for: receiving first point cloud data from the camera, the first point cloud data representing a person; identifying a first human body template, the first human body template representing body joints; generating, based on a comparison of the first human body template to the first point cloud data, parameters associated with the body joints; and generating, based on the parameters, a second human body template representing the person.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method comprising:
   generating, by at least one processor circuit programmed by at least one instruction, parameters associated with body joints of a first human body template based on a comparison of the first human body template to first point cloud data, the first point cloud data based on a camera;
   generating, based on the parameters, a second human body template representative of a person;
   determining, by one or more of the at least one processor circuit, a chamfer distance based on the first point cloud data and second point cloud data, the second point cloud data based on the camera; and
   generating, based on the chamfer distance, a third human body template representative of the person.

2. The method of claim 1, including performing a k-nearest neighbors technique based on the second human body template and third point cloud data from the camera to generate the second point cloud data.

3. The method of claim 1, including:
   generating three-dimensional joint locations of the person based on the first point cloud data and two-dimensional pixel data from the camera,
   wherein the generating of the second human body template is based on the three-dimensional joint locations.

4. The method of claim 1, wherein the first point cloud data is based on a first image of multiple images from the camera, and the camera is a sole source of the multiple images.

5. The method of claim 4, wherein the images are indicative of rotation of the person.

6. The method of claim 1, wherein the first human body template is a Skinned Multi-Person Linear (SMPL) model.

7. A non-transitory computer-readable medium comprising computer-executable instructions to cause at least one processor circuit to at least:
   generate parameters associated with body joints of a first human body template based on a comparison of the first human body template to first point cloud data, the first point cloud data from a camera;
   generate, based on the parameters, a second human body template representative of a person;
   perform a k-nearest neighbors technique based on the second human body template and second point cloud data from the camera to generate third point cloud data; and
   generate a third human body template based on the third point cloud data.

8. The non-transitory computer-readable medium of claim 7, wherein the instructions are to cause one or more of the at least one processor circuit to:
   generate three-dimensional joint locations of the person based on the first point cloud data and two-dimensional pixel data from the camera,
   wherein generation of the second human body template is based on the three-dimensional joint locations.

9. The non-transitory computer-readable medium of claim 7, wherein the first point cloud data is based on a first image of multiple images from the camera, and the camera is a sole source of the multiple images.

10. The non-transitory computer-readable medium of claim 9, wherein the images are indicative of rotation of the person.

11. The non-transitory computer-readable medium of claim 7, wherein the instructions are to cause one or more of the at least one processor circuit to:
   determine a chamfer distance based on the first point cloud data and the third point cloud data, and the generation of the third human body template is based on the chamfer distance.

12. The non-transitory computer-readable medium of claim 7, wherein the first human body template is a Skinned Multi-Person Linear (SMPL) model.

13. A device comprising:
   interface circuitry;
   machine-readable instructions; and
   at least one processor circuit to be programmed based on the instructions to:
      generate parameters associated with body joints of a first human body template based on a comparison of the first human body template to first point cloud data, the first point cloud data from a camera;
      generate, based on the parameters, a second human body template representative of a person;
      perform a k-nearest neighbors technique based on the second human body template and second point cloud data from the camera to generate third point cloud data; and
      generate a third human body template based on the third point cloud data.

14. The device of claim 13, wherein one or more of the at least one processor circuit is to:
   generate three-dimensional joint locations of the person based on the first point cloud data and two-dimensional pixel data from the camera; and
   generate the second human body template is further based on the three-dimensional joint locations.

15. The device of claim 13, wherein one or more of the at least one processor circuit is to:
   determine a chamfer distance based on the first point cloud data and the third point cloud data; and
   generate the third human body template based on the chamfer distance.

16. The device of claim 13, wherein the first point cloud data is based on a first image of multiple images from the camera, and the camera is a sole source of the multiple images.

17. The device of claim 16, wherein the images are indicative of rotation of the person.

18. The device of claim 13, wherein the first human body template is a Skinned Multi-Person Linear (SMPL) model.

* * * * *

UNITED STATES PATENT AND TRADEMARK OFFICE
CERTIFICATE OF CORRECTION

| | |
|---|---|
| PATENT NO. | : 12,482,173 B2 |
| APPLICATION NO. | : 17/645681 |
| DATED | : November 25, 2025 |
| INVENTOR(S) | : Zhang et al. |

Page 1 of 1

It is certified that error appears in the above-identified patent and that said Letters Patent is hereby corrected as shown below:

In the Claims

Column 22, Line 23 (Claim 14), delete "is further"

Signed and Sealed this
Twenty-seventh Day of January, 2026

John A. Squires
*Director of the United States Patent and Trademark Office*